United States Patent
Woronowicz et al.

(10) Patent No.: US 10,403,432 B2
(45) Date of Patent: Sep. 3, 2019

(54) POWER TRANSFER UNIT OF A SYSTEM FOR INDUCTIVE POWER TRANSFER, A METHOD OF MANUFACTURING A PRIMARY POWER TRANSFER UNIT AND OF OPERATING A PRIMARY POWER TRANSFER UNIT

(71) Applicant: Bombardier Primove GmbH, Berlin (DE)

(72) Inventors: Konrad Woronowicz, Kingston (CA); Robert Czainski, Doluje (PL)

(73) Assignee: Bombardier Primove GmbH, Berlin (DE)

( * ) Notice: Subject to any disclaimer, the term of this patent is extended or adjusted under 35 U.S.C. 154(b) by 26 days.

(21) Appl. No.: 15/550,967

(22) PCT Filed: Feb. 15, 2016

(86) PCT No.: PCT/EP2016/053160
§ 371 (c)(1),
(2) Date: Aug. 14, 2017

(87) PCT Pub. No.: WO2016/131767
PCT Pub. Date: Aug. 25, 2016

(65) Prior Publication Data
US 2018/0025839 A1    Jan. 25, 2018

(30) Foreign Application Priority Data
Feb. 16, 2015  (GB) .................................. 1502527.3

(51) Int. Cl.
*H01F 38/00* (2006.01)
*H01F 38/14* (2006.01)
(Continued)

(52) U.S. Cl.
CPC ............ *H01F 38/14* (2013.01); *H01F 41/04* (2013.01); *H02J 50/10* (2016.02); *B60L 53/12* (2019.02); *H01F 27/36* (2013.01)

(58) Field of Classification Search
None
See application file for complete search history.

(56) References Cited

U.S. PATENT DOCUMENTS

| 8,772,973 B2 * | 7/2014 | Kurs ....................... H02J 5/005 307/104 |
| 8,997,955 B2 | 4/2015 | Czainski et al. |

(Continued)

FOREIGN PATENT DOCUMENTS

| CN | 104024027 A | 9/2014 |
| DE | 102008024602 A1 | 12/2009 |

(Continued)

OTHER PUBLICATIONS

Covic et al., "A Bipolar Primary Pad Topology for EV Stationary Charging and Highway Power by Inductive Coupling" 2011, Department of Electrical and Computer Engineering, University of Auckland, Auckland, New Zealand, pp. 1832-1838.

*Primary Examiner* — Lincoln D Donovan
*Assistant Examiner* — Khareem E Almo
(74) *Attorney, Agent, or Firm* — The Webb Law Firm

(57) ABSTRACT

A power transfer unit of a system for inductive power transfer, wherein the power transfer unit includes a winding structure, and at least one flux guiding means for guiding a magnetic flux of the electromagnetic field, wherein the at least one flux guiding means provides at least one low reluctance section with a first reluctance and at least one high reluctance section with a second reluctance, and the second reluctance is higher than the first reluctance. Also, a (Continued)

method of manufacturing a power transfer unit and a method of operating a power transfer unit.

11 Claims, 3 Drawing Sheets

(51) Int. Cl.
*H02J 50/10* (2016.01)
*H01F 41/04* (2006.01)
*H01F 27/36* (2006.01)
*B60L 53/12* (2019.01)

(56) References Cited

U.S. PATENT DOCUMENTS

| | | | |
|---|---|---|---|
| 9,667,062 B2* | 5/2017 | Hall | H01F 3/10 |
| 9,906,067 B1* | 2/2018 | Garrity | H02J 7/025 |
| 2007/0188284 A1* | 8/2007 | Dobbs | A61B 6/56 |
| | | | 336/120 |
| 2008/0265684 A1* | 10/2008 | Farkas | B60L 58/40 |
| | | | 307/104 |
| 2010/0007215 A1 | 1/2010 | Sakuma | |
| 2010/0072815 A1 | 3/2010 | Hahn et al. | |
| 2013/0127580 A1* | 5/2013 | Dobbs | H01F 30/06 |
| | | | 336/84 M |
| 2013/0233663 A1* | 9/2013 | Czainski | B60L 5/005 |
| | | | 191/10 |
| 2014/0285138 A1 | 9/2014 | Duschl-Graw | |
| 2014/0327391 A1 | 11/2014 | Niederhauser et al. | |
| 2014/0361630 A1 | 12/2014 | Boys et al. | |
| 2015/0170832 A1 | 6/2015 | Covic et al. | |
| 2015/0236513 A1 | 8/2015 | Covic et al. | |
| 2015/0236546 A1* | 8/2015 | Kesler | H04B 5/0037 |
| | | | 455/573 |
| 2015/0255994 A1* | 9/2015 | Kesler | H02J 5/005 |
| | | | 307/10.1 |
| 2015/0302984 A1 | 10/2015 | Kurs | |
| 2016/0072304 A1* | 3/2016 | Anders | H01F 27/365 |
| | | | 307/104 |
| 2017/0217315 A1* | 8/2017 | Arnold | B60L 5/005 |
| 2017/0222490 A1* | 8/2017 | Boys | H01F 27/2804 |
| 2018/0111489 A1* | 4/2018 | Czainski | B60L 11/182 |
| 2018/0158601 A1 | 6/2018 | Kurs | |

FOREIGN PATENT DOCUMENTS

| | | |
|---|---|---|
| DE | 2013100530 U1 | 6/2014 |
| GB | 2485617 A | 5/2012 |
| GB | 2512862 A | 10/2014 |
| GB | 2512864 A | 10/2014 |
| WO | 2013122483 A1 | 8/2013 |
| WO | 2014011059 A1 | 1/2014 |
| WO | 2014122125 A1 | 8/2014 |
| WO | 2014158034 A1 | 10/2014 |
| WO | 2015161035 A1 | 10/2015 |

* cited by examiner

State of the art

POWER TRANSFER UNIT OF A SYSTEM FOR INDUCTIVE POWER TRANSFER, A METHOD OF MANUFACTURING A PRIMARY POWER TRANSFER UNIT AND OF OPERATING A PRIMARY POWER TRANSFER UNIT

This application is the United States national phase of International Application No. PCT/EP2016/053160 filed Feb. 15, 2016, and claims priority to United Kingdom Patent Application No. 1502527.3 filed Feb. 16, 2015, the disclosures of which are hereby incorporated in their entirety by reference.

BACKGROUND OF THE INVENTION

Field of the Invention

The invention relates to a power transfer unit of a system for inductive power transfer, in particular of power transfer to a vehicle. Further, the invention relates to a method of manufacturing such a power transfer unit and a method of operating such a power transfer unit.

Description or Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device, which can also be referred to as secondary unit, adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary winding structure) and can be fed by a wayside power converter (WPC). The primary winding structure can be part of a way-sided primary unit. The second set of windings (secondary winding structure) is installed on the vehicle. For example, the second set of windings can be attached underneath the vehicle, in the case of trams under some of its wagons. For an automobile it can be attached to the vehicle chassis. The second set of windings or, generally, the secondary side is often referred to as pick-up-arrangement, receiver or secondary unit. The first set of windings and the second set of windings form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

GB 2512864 A1 discloses a primary unit comprising a housing, a primary winding structure and a connecting terminal. Further disclosed is at least one guiding means for guiding a magnetic flux.

GB 2485617 A1 discloses a system for transferring electrical energy to a vehicle, in particular to a road automobile or to a track bound vehicle such as a the light rail vehicle, wherein the system comprises an electric conductor arrangement for producing a magnetic field and for thereby transferring the energy to the vehicle. The electric conductor arrangement comprises at least one current line, wherein each current line is adapted to carry the electric current which produces the magnetic field or is adapted to carry one of parallel electric currents which produce the magnetic field and wherein the current line or lines extend(s) ad a first height level. The system further comprises an electrically conductive shield for shielding the magnetic field, wherein the shield extends under the track and extends below the first height level and a magnetic core extends along the track at a second height level and extends above the shield.

If a primary winding structure is energized in order to generate an electromagnetic field to be received by a secondary winding structure, not all field lines of the electromagnetic field will be received by the secondary winding structure. This, in turn, generates undesired electromagnetic emissions, i.e. an undesired flux density, beside the primary and the secondary winding structure. As humans or objects within the environment of primary and the secondary winding structure can be exposed to said emissions, it is desirable to reduce the emissions to a minimum in order to improve an operational safety of the system for inductive power transfer.

SUMMARY OF THE INVENTION

It is an object of the invention to provide a power transfer unit of a system for inductive power transfer to a vehicle, wherein undesired emissions or a field density in an environment of the power transfer unit is/are reduced.

It is the main idea of the invention to provide a flux guiding means for guiding a magnetic flux of the electromagnetic field generated or received by the a winding structure of the power transfer unit, wherein the flux guiding means has a varying reluctance. In the context of this invention, the reluctance denotes a magnetic resistance.

A power transfer unit of a system for inductive power transfer, in particular to a vehicle, is proposed.

The power transfer unit can be a primary unit of the system for inductive power transfer. Alternatively, the power transfer unit can be a secondary unit of the system for inductive power transfer.

The present invention can be applied in particular to the field of energy transfer to any land vehicle, for example track bound vehicles, such a rail vehicles (e.g. trams). Further, the invention relates to the field of energy transfer to road automobiles, such as individual (private) passenger cars or public transport vehicles (e.g. buses).

The power transfer unit comprises a winding structure. If the power transfer unit is a primary unit, the winding structure can be referred to as primary winding structure. The primary winding structure is used to generate an electromagnetic field (power transfer field).

If the power transfer unit is a secondary unit, the winding structure can be referred to as secondary winding structure. The secondary winding structure is used to receive the electromagnetic field, in particular the magnetic part of the electromagnetic field, generated by the primary unit.

The winding structure can comprise two or more sub-windings. A sub-winding can comprise one or more section(s) of a phase line of a main winding structure. The main winding structure can comprise one or more phase lines for carrying an electric current, e.g. three phase lines. A sub-winding can enclose a predetermined area. Also, a sub-winding can provide or form a coil, e.g. with a predetermined number of turns. Each sub-winding can provide a pole of the generated or received electromagnetic field. A sub-winding of the secondary winding structure can e.g. provide a pole if a current flows through the sub-winding structure.

The winding structure can comprise one or more phase lines for carrying an electric current. A phase line of the winding structure can be designed such that a course of the phase line provides an even or uneven number of sub-windings which are arranged adjacent to each other. In this context, a sub-winding can denote a, preferably complete, conductor loop which encloses a predetermined area. The conductor loop can provide or comprise one turn or multiple turns of the respective sub-winding. Adjacent to each other means that central axes of the sub-windings, in particular the axes of symmetry, are spaced apart from one another, e.g. with the predetermined distance, along the common straight line. This will be explained later. The common straight line can be parallel to a longitudinal axis of reference coordinate system and can correspond to a direction of extension of the winding structure. This means that a phase line of the winding structure can extend in a direction of extension, wherein a predetermined number of sub-windings is provided along said direction of extension.

Neighboring or adjacent sub-windings can be counter-oriented. In this context, counter-oriented can mean that a current flow in a first sub-winding is oriented clockwise, wherein the current flow in the neighboring or adjacent second sub-winding is oriented counter-clockwise. The clockwise direction can be defined with respect to the parallel central axes which point into the same direction. If a current flows through the said of sub-windings, adjacent sub-windings will generate a magnetic field of the magnitude by oriented in opposite directions.

Preferably, the winding structure can be 8-shaped. This can mean that a course of the at least phase line is 8-shaped. In this case, the phase line can comprise two e.g. circular-shaped or rectangular-shaped sub-windings which are arranged adjacent to each other along the aforementioned direction of extension.

Preferably, the winding structure can comprise three phase lines, wherein each phase line can comprise or provide multiple sub-windings which extend along a common direction of extension.

Alternatively, a phase line of a winding structure, in particular of a primary winding structure, can have a meandering course. In this context "meandering" means that the phase line of the winding structure extends along a track or route in a meandering manner, i.e. sections of an electric line which provides the phase line which extend in a longitudinal direction of the winding structure are followed in the course of the conductor by section which extends transversely to the longitudinal direction (i.e. in a lateral direction of the winding structure). In the case of a multiphase system with at least two electric phase lines, this preferably applies to all the phase lines.

Further, the power transfer unit comprises at least one flux guiding means for guiding a magnetic flux of the electromagnetic field which is generated or received by the winding structure.

The flux guiding means can be made of a magnetic, in particular ferromagnetic, material, preferably made of ferrite.

In the context of this invention, the following reference coordinate system can be used. A first axis, which can also be referred to as longitudinal axis, can extend parallel to a longitudinal axis of the winding structure, e.g. the afore-mentioned direction of extension. A second axis, which can also be referred to as lateral axis, can be oriented parallel to a lateral axis of the winding structure. A third axis, which can also be referred to as vertical axis, can be oriented to a main direction of propagation of the electromagnetic field generated or received by the winding structure, i.e. generated by a primary winding structure or received by a secondary winding structure, i.e. oriented from the primary winding structure towards a secondary winding structure. The first, the second and the third axis can provide a right-handed Cartesian coordinate system.

It is possible, that the third axis is oriented perpendicular to a surface of the route, in particular if the primary unit is integrated into a route and/or arranged under the surface of the route or if the secondary unit is arranged below or beneath the vehicle.

Alternatively, the third axis can be oriented perpendicular to an upper surface of the primary unit, in particular if the primary unit is installed on the surface of the route, e.g. as an elevated charging pad, or to a lower surface of the secondary unit.

A length can be measured along the first axis, a width can be measured along the second axis and a height can be measured along the third axis. Directional terms referring to a direction such as "above", "under", "ahead", "beside", can relate to the aforementioned longitudinal, lateral and vertical axes.

The flux guiding means can be arranged under the winding structure, in particular if the winding structure is a primary winding structure. In this case, the flux guiding means can be arranged on the opposite side of the primary winding structure as a secondary winding structure.

Alternatively, the flux guiding means can be arranged above the winding structure, in particular if the winding structure is a secondary winding structure. In this case, the flux guiding means can be arranged on the opposite side of the secondary winding structure as a primary winding structure.

The flux guiding means or upper surface of the flux guiding means can be arranged in a plane which is oriented perpendicular to the aforementioned third axis. The flux guiding means preferably comprises multiple flux guiding elements such as bars or plates made of a magnetic material, preferably ferrite.

In particular, the winding structure or the portion of the winding structure which generates or receives the electromagnetic field can be fully arranged within an envelope of the flux guiding means if projected into a common plane of projection, wherein the common plane of projection can be oriented perpendicular to the aforementioned third axes.

This means that a length of the flux guiding means along the first axis is larger than a length of the winding structure and a width of the flux guiding means along the second axis is larger than the width of the winding structure.

Further, the at least one flux guiding means comprises or provides at least one low reluctance section with a first reluctance and at least one high reluctance section with another reluctance, wherein the other reluctance is higher than the first reluctance. Preferably, the at least one flux guiding means comprises or provides two low reluctance sections with the first reluctance and one single high reluctance section with the other reluctance. It is, however, also possible that the flux guiding means comprises or provides more than one or more than two low reluctance sections and/or more than one high reluctance section.

In particular, the at least one flux guiding means can be arranged or designed that a path of at least one field line of the electromagnetic field generated or received by the winding structure within or through the flux guiding means comprises a path section through the at least one low reluctance section and a path section through the at least one high reluctance section.

The field line can extend along a closed path. More particular, the closed path of the field line can be arranged within a plane which is oriented orthogonal to the aforementioned second axis. In this case, the orientation of the field line can have a portion parallel to the first axis and/or a portion parallel to the third axis.

Further, the low reluctance section and the high reluctance section can be arranged adjacent to one another along the aforementioned first axis. This means that a field line which extends through the flux guiding means parallel to the first axis will extend through the low reluctance section and the high reluctance section.

In other words, a reluctance control is provided, preferably a reluctance control in the direction of extension of the averaged main field lines through the flux guiding means.

Further, the high reluctance section extends parallel to a lateral axis of the winding structure. As mentioned before, the lateral axis can be also referred to a second axis. Preferably the high reluctance section extends along the full or total width of the flux guiding means. This means that a width of the high reluctance section is equal to a width of the flux guiding means. As will be explained later, the high reluctance section can also have a predetermined length (along the longitudinal direction) and a predetermined height (along the vertical direction), in particular a height equal to the height of the flux guiding means.

This advantageously provides an effective reduction of the flux density in a volume beside the winding structure.

According to the invention, a geometric center or centerline of the high reluctance section is arranged within a center plane between two adjacent poles provided by the winding structure. The center plane can thus provide a mirror plane for two halves of the high reluctance section. The centerline of the high reluctance section can be oriented parallel to the aforementioned second axis.

As mentioned before, the winding structure can comprise multiple, preferably two, sub-windings. In case of two sub-windings, the geometric center or centerline of the high reluctance section can be arranged within a center plane, wherein the center plane is oriented perpendicular to a connecting line between the geometric centers of the two sub-windings and arranged in the middle of said geometric centers. If the geometric centers of the sub-windings are arranged along the first axis, the center plane can be oriented perpendicular to the aforementioned first axis and can be located or arranged in the middle between the two geometric centers of the sub-windings.

Said center plane can provide the center plane between two adjacent poles.

In another preferred embodiment the at least one high reluctance section is provided by a gap, in particular an air gap, between two low reluctance sections. This means that the flux guiding means comprises two low reluctance sections which are split by the gap which provides the high reluctance section.

Simulations and experiments have shown that such a design of the flux guiding means advantageously allows reducing a flux density in an environment of the winding structure, in particular beside the winding structure, while keeping the flux density above the primary winding structure or below a secondary winding structure almost constant. In other words, the proposed design of the flux guiding means results in a higher decrease of the flux density in a volume outside the winding structure, e.g. beside the winding structure, than in a volume above the winding structure (if the winding structure provides a primary winding structure) or below the winding structure (if the winding structure provides a secondary winding structure). This, in turn, means that undesired emissions to which people or objects may be exposed are reduced effectively while no or only a minimal decrease of the power transfer efficiency occurs.

In another embodiment the at least flux guiding means is designed as a flux guiding layer. The layer can be arranged under the winding structure if it provides a primary winding structure or above the winding structure if it provides a secondary winding structure. In particular, the length of the layer can be larger than the length of the winding structure and the width of the layer can be larger than the width of the winding structure. This advantageously provides an effective guiding of the magnetic flux.

In another embodiment, the flux guiding layer comprises one or more ferrite bar(s) or ferrite plate(s), wherein the ferrite bar(s) or ferrite plate(s) extend parallel to a longitudinal direction of the winding structure. The longitudinal direction can be oriented parallel to the aforementioned first axis. This can mean that a length of the ferrite bar or ferrite plate can be larger than a width and/or a height of the ferrite bar/plate. Preferably, multiple ferrite bars or ferrite plates are arranged adjacent to each other such that a closed (upper) surface of the flux guiding means is provided. In this case, the ferrite bars or plates can abut. This means that no air gap is provided between contact surfaces of the ferrite bars/plates.

This advantageously provides a simple and cheap layer of the flux guiding means.

In a preferred embodiment the at least one high reluctance section is provided at least partially by a diminution of a cross-sectional area of the at least one flux guiding means. The cross-sectional area can be an area which of in a section plane which is oriented perpendicular to the flux direction or the longitudinal axis. The flux direction in the flux guiding means can be parallel to the longitudinal direction. The term "diminution" comprises also a break or gap within the flux guiding means, i.e. with a cross-sectional area of zero. A diminution of a cross-sectional area can e.g. be provided by a recess in the at least one flux guiding means. In the scope of this invention, the term "recess" can also denote a hole, a gap, a groove, a nut or a slit. The recess can be an opening or through hole. This means that the recess can extend from one surface of the flux guiding means to an opposite surface of the flux guiding means. The recess or hole can have a predetermined height along the aforementioned third axis, e.g. a height which equals to the height of the flux guiding means. The recess can e.g. be also designed as a channel or a notch. In the case that the high reluctance section is provided by an opening, e.g. a through-hole, the flux guiding means, in particular the low reluctance sections, is/are interrupted or broken by the high reluctance section. In this case, the high reluctance section can be provided by air or another material arranged within the recess.

It is, however, also possible, to provide a material with the aforementioned other reluctance in order to compensate for the diminution of the cross-sectional area, wherein the volume fraction provided by this material provides the high reluctance section at least partially. The material can e.g. be plastic. In other word, a material with the other reluctance can be arranged within the aforementioned recess.

In summary, the provision of a recess provides a very simple design of the high reluctance section. The gap can extend parallel to the aforementioned second axis preferably along a total width of the flux guiding means.

Simulation and experiments have shown that the provision of an air gap between two low reluctance sections, e.g. low reluctance sections provided by an arrangement of one or more ferrite bar(s) or ferrite plate(s) advantageously provides a strong reduction of undesired emissions while minimizing a reduction of the electromagnetic field which is used for the inductive power transfer and to be received by a secondary winding structure.

In another embodiment, the power transfer unit comprises at least one flux control means for controlling, e.g. for increasing or decreasing, the flux in the flux guiding means. The flux control means can also be referred to as reluctance control means. The at least one flux control means can be provided as a means or element separate from the winding structure. The at least one flux control means can be designed and/or arranged relative to the flux guiding means such that the flux of the electromagnetic field for power transfer in a predetermined section of the flux guiding means can be controlled. In this case, the section can provide the aforementioned high reluctance section. The at least one flux control means can be provided in addition or instead of the diminution of the cross-sectional area.

In particular, the at least one flux control means can be provided by at least one flux control winding structure, e.g. a flux control coil. The flux control winding structure can also be referred to as reluctance control winding structure. The flux control winding structure can be arranged relative to the flux guiding means such that a control flux generated by the flux control winding structure superimposes at least partially the flux generated by the winding structure and guided by the flux guiding means and/or within a predetermined section of the flux guiding means.

For example, the flux control winding structure can be wound around the flux guiding means, in particular around a predetermined section of the flux guiding means. An area enclosed by the flux control winding structure can be oriented perpendicular to the direction of the flux guided within the flux guiding means.

If a flux control current is supplied to the flux control winding structure, a direction of the control flux can be oriented opposite or in the direction of the flux guided in the flux guiding means. If the control flux is oriented at least partially opposite to the direction of the flux guided in the flux guiding means, the resulting reluctance of the section of the flux guiding means increases. Controlling the flux control current advantageously allows adjusting the resulting reluctance and e.g. to provide a high reluctance section.

In another embodiment, the high reluctance section is arranged symmetrical with respect to the winding structure.

Symmetrical in context can mean that the high reluctance section is placed in a geometrical center or extends along a centerline of a magnetic field dipole which is provided if the winding structure is energized, i.e. generates an electromagnetic field or receives an electromagnetic field. The magnetic field denotes the magnetic part of the electromagnetic field and can have to virtual poles, wherein the geometrical center is centered between these poles. The centerline can comprise the geometrical center and can be oriented perpendicular to a line connecting the virtual poles, e.g. parallel to the aforementioned second axis.

If the winding structure is 8-shaped and single-phased, the geometric center corresponds to the geometric center of the winding structure. Further, the centerline can extend parallel to the aforementioned second axis and intersect the geometric center.

In case of a multiphase system, the centerline will not necessarily extend parallel to the aforementioned second axis and intersect the geometric center but dependent on all parts of the winding structure which are oriented parallel to the second axis along the length of the winding structure in the first axis direction. As it is desirable to provide a constant or almost constant resulting reluctance between the virtual poles for each current value of the operating currents, e.g. each moment of the multi-phase current supply. That can mean that multiple high reluctance section needs to be provided, e.g. by many small recesses, to provide the desired reluctance value same for each current value of the operating currents. The multiple high reluctance sections can be connected or unconnected.

In another embodiment, the winding structure comprises a first sub-winding and at least one other sub-winding, wherein a winding section of the first sub-winding and a winding section of the other sub-winding extend parallel to each other and are arranged adjacent to each other within a common winding section. Thus, the common winding section is provided by the said adjacent winding sections of two adjacent sub-windings.

This includes particularly the case that the winding sections of the first and the other sub-winding can be arranged adjacent to each other along the first axis and/or the third axis and extend along the second axis. The winding section of the first sub-winding and the winding section of the other sub-winding can abut.

The at least one high reluctance section is arranged under the common winding section. This advantageously provides a symmetrical arrangement of the high reluctance section in the case of a so called Double-D winding structure which comprises only two sub-windings.

In another embodiment, a maximal length of the high reluctance section along a longitudinal axis of the primary winding structure is higher than 0.0 mm and smaller than or equal to 30.0 mm. Preferably, the maximal length is higher than 5.0 mm and smaller than or equal to 20.0 mm.

It has been shown that with an increasing length of the high reluctance section along the longitudinal axis, the field density in a reference volume above or below the winding structure (main magnetization) decreases less than a field density in a volume outside the reference volume of the winding structure, in particular in a limited distance range from the winding. Outside the said distance range, the field density can be zero or close to zero. This means that a main magnetization decreases less than an external magnetization. The reference volume above the primary winding structure or below the secondary winding structure can be a volume of a cylinder, wherein a ground plane of the cylinder is provided by an envelope of the winding structure and a shell surface extends along the aforementioned third axis.

The proposed intervals advantageously cover length values which provide a good trade-off between the reduction of the main magnetization and the external magnetization.

Further proposed is a method of manufacturing power transfer unit, e.g. a primary unit or a secondary unit, comprising the steps of providing a winding structure, e.g. a primary winding structure or a secondary winding structure, providing at least one flux guiding means for a means for guiding a magnetic flux of the electromagnetic field generated or received by the winding structure, wherein the at least one flux guiding means is provided, e.g. arranged and/or designed such that the at least one flux guiding means comprises or provides at least one low reluctance section with a first reluctance and at least one high reluctance section with another reluctance, wherein the other reluctance is higher than the first reluctance.

The proposed method advantageously allows providing a power transfer unit according to one of the embodiments described in this invention. Thus, a method is proposed which comprises all necessary steps for manufacturing such a power transfer unit.

In another embodiment, the at least one high reluctance section is designed and arranged such that first predetermined flux density at a reference point in a reference volume above the winding structure (if the winding structure is a primary winding) or below the winding structure (if the winding structure is a secondary winding) is provided, wherein the flux density at a reference point outside the reference volume is smaller than another predetermined flux density.

The reference points within and outside the reference volume can be located at the same height level.

The other predetermined flux density can e.g. be a flux density which is provided if the at least one flux guiding means comprises or provides only a constant, e.g. homogeneous, reluctance.

This means that the at least one high reluctance section can be designed and/or arranged such that a desired reduction of the flux density outside the reference volume is provided, while a desired flux density in the reference volume of the winding structure and thus a desired magnetic coupling, is ensured. In particular, a length of the high reluctance section, e.g. the air gap, along the longitudinal axis of the winding structure can be chosen such that the flux density in the predetermined reference volume reaches a predetermined percentage, e.g. 50%, 60%, 70%, 80% or even 90% of the flux density without the proposed high reluctance section. Then, a number of ampere turns can be changed such that a desired flux density in the reference volume is provided. This allows providing a desired main magnetization while reducing the external flux density.

In another embodiment, at least one flux control means of the power transfer unit is controlled such that a desired reluctance is provided in at least one section of the flux guiding means. In particular, a flux control current supplied to a flux control winding structure of the power transfer unit can be controlled such that a reluctance within a predetermined section of the flux guiding means is higher than the reluctance within the remaining sections. The flux control current can have the same frequency and the same phase as the current supplied to the winding structure for generating the power transfer field or the current generated by the winding structure receiving the power transfer field.

BRIEF DESCRIPTION OF THE DRAWINGS

The invention will be described with reference to the attached figures.

DESCRIPTION OF THE INVENTION

Figure 1:
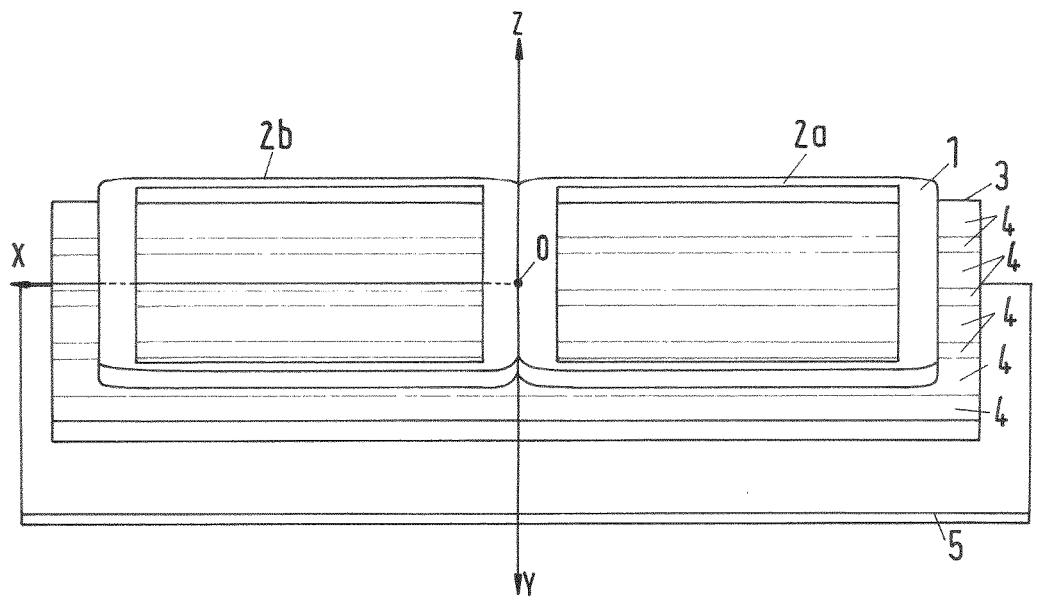
FIG. 1 a winding structure and a flux guiding means according to the state of the art, FIG. 2 a winding structure and a flux guiding means according to the invention, FIG. 3 a schematic diagram presenting a dependency of a flux density distribution as a function of a distance and a length of a lateral area gap, FIG. 4 a schematic top view on a flux guiding means according to the invention, and FIG. 5 a perspective view on a flux guiding means and a flux control winding structure.

FIG. 1 shows a perspective view of primary winding structure with flux guiding means according to the state of the art.

Shown is a reference coordinate system with a longitudinal axis x, a lateral axis y and a vertical axis z. An origin O of the reference coordinate system is located at a geometric center of a winding structure 1. The winding structure 1 comprises a first rectangular-shaped sub-winding 2a and a second rectangular-shaped sub-winding 2b. These sub-windings 2a, 2b are arranged adjacent to each other along the longitudinal axis x.

A longitudinal direction is indicated by an arrow head of the longitudinal axis x. Correspondingly, a lateral direction and a vertical direction are indicated by arrow heads of the respective axes y, z.

This means that geometric centers (not shown) of the first and the second sub-winding 2a, 2b are arranged on a line which is parallel to the longitudinal axis x. The winding structure 1 is mirror symmetric with respect to a mirror plane which comprises the origin O and is oriented perpendicular to the longitudinal axis x.

With respect to the vertical direction, a flux guiding element 3 is arranged under the winding structure 1. It is shown that the flux guiding means 3 comprises multiple elongated flux guiding elements 4 which provide a closed upper surface. The flux guiding elements 4 are made of ferrite and can also be referred to as ferrite elements or ferrite plates.

It is shown that a length of the flux guiding means 3 is larger than a length of the winding structure 1 in a common plane of projection, wherein the common plane of projection is oriented orthogonal to the vertical axis z. Also, a width of the flux guiding means 3 is larger than a width of the winding structure 1.

Also shown is a shielding element 5 which can e.g. be provided by an aluminum plate. This shielding element 5 is arranged under the flux guiding means 3.

The following description refers to a primary winding structure which is provided by the shown winding structure 1. Aspects of the following description, however, also apply to a secondary winding structure. In the case that the shown winding structure 2 corresponds to a secondary winding structure, the flux guiding element 3 would be arranged above the winding structure, wherein the shielding element 5 would be arranged above the flux guiding element 3.

Figure 2:
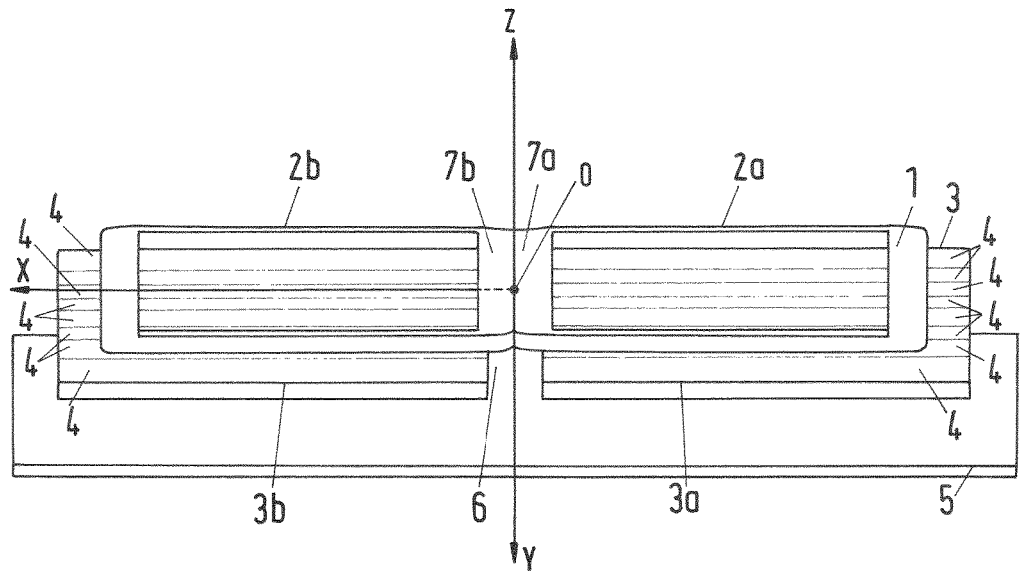

FIG. 2 shows a schematic perspective view of a winding structure 1 and a flux guiding means 3 according to the invention.

In contrast to the state of the art shown in FIG. 1, the flux guiding means 3 comprises a first section 3a and a second section 3b and an air gap 6 in between the first and the second section 3a, 3b. Each of the first and second sections 3a, 3b comprises flux guiding elements 4 which provide a closed upper surface for each section 3a, 3b. The first section 3a provides a first low reluctance section, the air gap 6 provides a high reluctance section and the second section 3b provides a second low reluctance section. This means that a reluctance of the first and the second section 3a, 3b is lower than the reluctance of the air gap 6. The first and the second section 3a, 3b can have the same reluctance.

The air gap 6 extends parallel to the lateral axis y, wherein a width of the air gap 6 along said lateral axis y equals the width of the sections 3a, 3b. Extending along the lateral axis y can mean that a dimension of the high reluctance section provided by the air gap 6 along the lateral axis y is higher than a dimension of the high reluctance section along the longitudinal axis x. A length of the air gap 6 along the longitudinal axis x is chosen from an interval ranging from 0.0 mm (not included) to 30.0 mm (included).

It is shown that the first and the second section 3a, 3b have the same width, the same length and the same height, i.e. thickness. It is further shown that a central axis of symmetry of the air gap 6 is arranged in the aforementioned mirror plane and extends parallel to the lateral axis y. This means that the air gap 6 is also designed mirror symmetric with respect to said mirror plane.

Further shown is a winding section 7a of the first sub-winding 2a and a winding section 7b of the second sub-winding 2b which extend parallel to each other along the lateral axis y and are arranged adjacent to each other along the longitudinal axis x, i.e. abut against each other. These winding sections 7a, 7b, are arranged in a common winding section of the first and second sub-winding 2a, 2b. The air gap 6 is arranged below this common winding section.

The first sub-winding 2a can provide a first pole and the second sub-winding 2b can provide a second pole of an electromagnetic field, in particular virtual poles of a magnetic part of the electromagnetic field, generated if the winding structure 1 is energized. The air gap 6 is arranged mirror symmetric with respect to these poles. This can e.g. mean that the air gap 6 is arranged mirror symmetric respect to a mirror plane which is oriented orthogonal to a straight line connecting the two poles, wherein a centerline of the air gap 6 is arranged within this said mirror plane. In other words, the air gap 6 is arranged in centrally under the first and the second sub-winding 2a, 2b.

Figure 3:
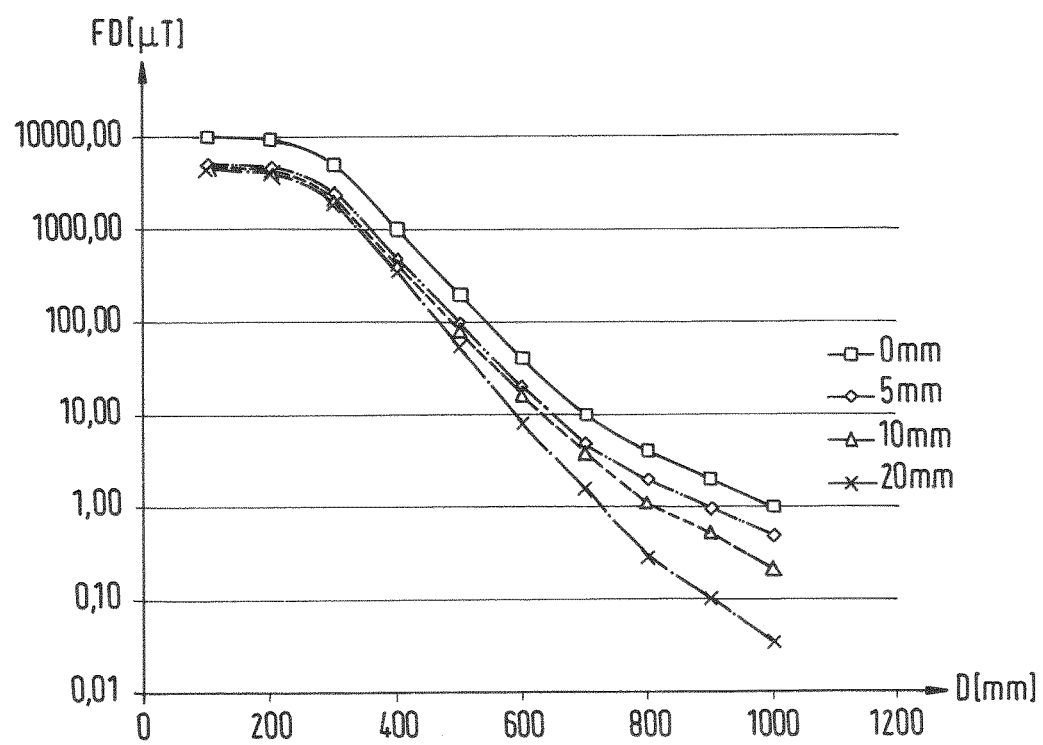

FIG. 3 shows a dependency of a flux density FD as a function of a distance D from the origin O (see FIG. 2) along the lateral axis y for different length of the air gap 6. A graph with rectangular dots indicates the flux density FD with an air gap length of 0.0 mm which means that the configuration correspond to the embodiment shown in FIG. 1. A graph with parallelogram-like dots indicates the flux density for an air gap length of 5.0 mm. A graph with triangular dots indicates the flux density FD for an air gap length of 10.0 mm. A graph with cross-like dots indicates the flux density FD for an air gap length of 20.0 mm.

It can be seen that the higher the length of the air gap 6, the more decrease of the flux density FD with an increasing distance D is provided. An increasing length of the air gap 6, however, will also reduce the flux density along the vertical axis z (see FIG. 2) and thus reduce a magnetic coupling between the shown winding structure 1 and another winding structure of the system for inductive power transfer, e.g. a secondary winding structure (if the shown winding structure 1 is a primary winding structure) or a primary winding structure (if the shown winding structure 1 is a secondary winding structure). Thus, a trade-off between a reduction of the flux density FD in a volume outside a reference volume of the winding structure 1 and the reduction within said reference volume above the winding structure 1 has to be found.

The reference volume of the winding structure 1, which can also be referred to as active volume, can denote the cylindrical volume which extends along the vertical axis z and comprises the winding structure 1 in a cross section plane which is oriented orthogonal to vertical axis z.

If the shown winding structure 1 would correspond to a secondary winding structure, the reference volume would be located below the winding structure 1.

Figure 4:
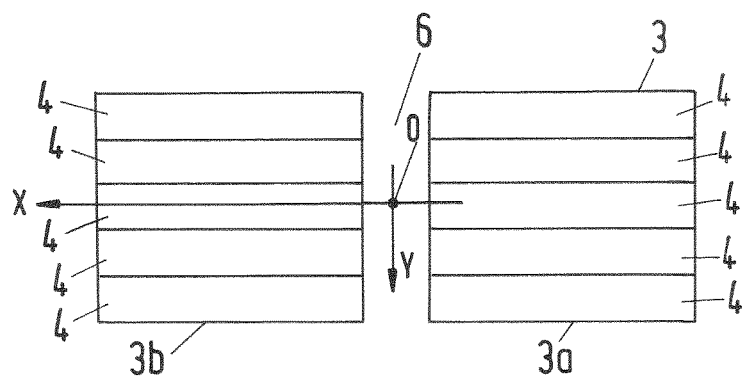

FIG. 4 shows a schematic top view on a flux guiding means 3 according to the invention. Shown are the first and a second section 3a, 3b which are provided by an arrangement of elongated flux guiding elements 4, e.g. ferrite bars. These sections 3a, 3b are spatially separated by an air gap 6. Between the spatially separated first and second section 3a, 3b, an air gap 6 is arranged which provides a high reluctance section according to the invention. It is shown that the air gap 6 extends along the full width the flux guiding means 3 along the lateral axis y.

Figure 5:
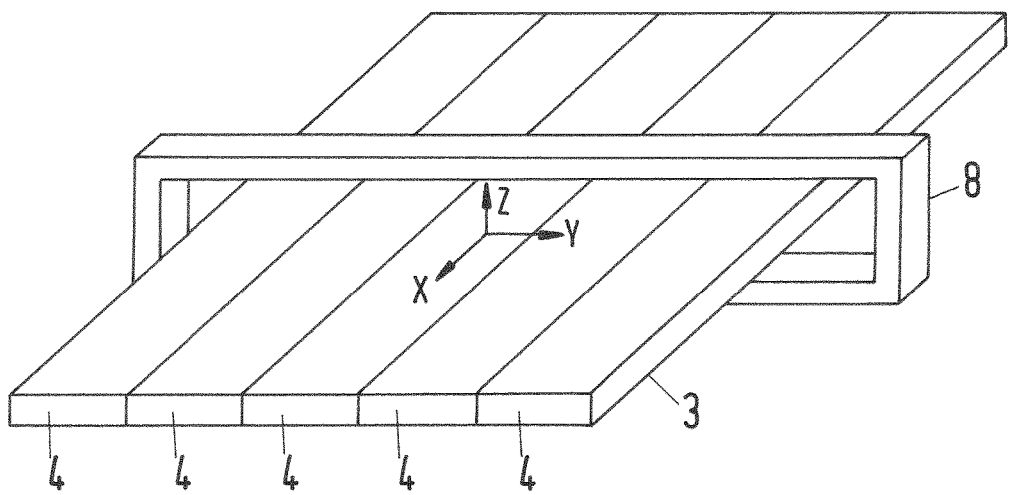

FIG. 5 shows a perspective view on a flux guiding means 3 and a flux control winding structure 8. The flux guiding means 3 is provided by an arrangement of elongated flux guiding elements 4, e.g. ferrite bars. The flux guiding means 3 has a constant cross-sectional area in a section plane which is oriented perpendicular to the longitudinal axis x. A flux direction of the power flux of the power transfer field generated by a winding structure 1 or received by a winding structure can be oriented in a direction opposite to the direction of the longitudinal axis x. The flux control winding structure 8 is wound around a central section of the flux guiding means 3. If a flux control current is provided to the flux control winding structure 8, a control flux will be generated which superimposes the power flux. If a flux direction of the control flux is oriented opposite to the direction of the power flux, e.g. in the direction of the longitudinal axis x, a high reluctance section is provided in the central section. By adjusting the flux control current, the reluctance can be adjusted to a desired value.

The invention claimed is:

1. A power transfer unit of a system for inductive power transfer, wherein the power transfer unit comprises:
    a winding structure; and
    at least one flux guiding means for guiding a magnetic flux of an electromagnetic field;
    wherein the at least one flux guiding means comprises or provides at least one low reluctance section with a first reluctance and at least one high reluctance section with a second reluctance, wherein the second reluctance is higher than the first reluctance, wherein the at least one high reluctance section extends parallel to a lateral axis of the winding structure, wherein the lateral axis is an axis of a right-handed Cartesian coordinate system;
    wherein a geometric centre or centreline of the at least one high reluctance section is arranged within a centre plane between two adjacent poles provided by the winding structure;
    wherein the at least one high reluctance section is provided by a gap between two low reluctance sections, wherein the gap extends along a total width of the at least one flux guiding means;
    wherein the winding structure comprises a first sub-winding and at least one second sub-winding, wherein a winding section of the first sub-winding and a winding section of the at least one second sub-winding extend parallel to each other and are arranged adjacent to each other within a common winding section, and the winding section of the first sub-winding and the winding section of the at least one second sub-winding extend along the lateral axis;
    wherein the at least one high reluctance section is arranged under the common winding section; and
    wherein the first sub-winding of the winding structure provides a pole if a current flows through the first sub-winding of the winding structure or the at least one second sub-winding of the winding structure provides a pole if a current flows through the at least one second sub-winding.

2. The power transfer unit according to claim 1, wherein the at least one flux guiding means is designed as a flux guiding layer.

3. The power transfer unit according to claim 1, wherein the flux guiding layer comprises one or more ferrite bars or ferrite plates, wherein the ferrite bars or ferrite plates extend parallel to a longitudinal axis of the winding structure, wherein the longitudinal axis is an axis of the right-handed Cartesian coordinate system.

4. The power transfer unit according to claim 1, wherein the at least one high reluctance section is provided at least partially by a diminution of a cross-sectional area of the at least one flux guiding means.

5. The power transfer unit according to claim 1, wherein the power transfer unit comprises at least one flux control means for controlling the flux in the flux guiding means.

6. The power transfer unit according to claim 1, wherein the at least one high reluctance section is arranged symmetrical with respect to the winding structure.

7. The power transfer unit according to claim 1, wherein a maximal length of the at least one high reluctance section along a longitudinal axis of the winding structure is higher than 0.0 mm and smaller than or equal to 30.0 mm.

8. A method of manufacturing a power transfer unit comprising the steps of:
providing a winding structure; and
providing at least one flux guiding means for guiding a magnetic flux of an electromagnetic field such that the at least one flux guiding means comprises or provides at least one low reluctance section with a first reluctance and at least one high reluctance section with a second reluctance, wherein the second reluctance is higher than the first reluctance, wherein the at least one high reluctance section extends parallel to a lateral axis of the winding structure, wherein the lateral axis is an axis of a right-handed Cartesian coordinate system;
wherein a geometric centre or centreline of the at least one high reluctance section is arranged within a centre plane between two adjacent poles provided by the winding structure;
wherein the at least one high reluctance section is provided by a gap between two low reluctance sections, wherein the gap extends along a total width of the flux guiding means;
wherein the winding structure comprises a first sub-winding and at least one second sub-winding, wherein a winding section of the first sub-winding and a winding section of the at least one second sub-winding extend parallel to each other and are arranged adjacent to each other within a common winding section, and the winding section of the first sub-winding and the winding section of the at least one second sub-winding extend along the lateral axis;
wherein the at least one high reluctance section is arranged under the common winding section; and
wherein the first sub-winding of the winding structure provides a pole if a current flows through the first sub-winding or the at least one second sub-winding of the winding structure provides a pole if a current flows through the at least one second sub-winding.

9. The method according to claim 8, wherein the at least one high reluctance section is designed and or arranged such that a first predetermined field density at a predetermined reference point in a reference volume above or below the winding structure is provided, wherein the flux density at a predetermined reference point outside the reference volume is smaller than another predetermined flux density.

10. A method of operating a power transfer unit according to claim 1, wherein the power transfer unit is energized.

11. The method of claim 10, wherein at least one flux control means of the power transfer unit is controlled such that a desired reluctance is provided in at least one section of the flux guiding means.

* * * * *

UNITED STATES PATENT AND TRADEMARK OFFICE
CERTIFICATE OF CORRECTION

| | |
|---|---|
| PATENT NO. | : 10,403,432 B2 |
| APPLICATION NO. | : 15/550967 |
| DATED | : September 3, 2019 |
| INVENTOR(S) | : Konrad Woronowicz et al. |

Page 1 of 1

It is certified that error appears in the above-identified patent and that said Letters Patent is hereby corrected as shown below:

On the Title Page

Item (54) and in the Specification, Column 1, Lines 1-6, delete "POWER TRANSFER UNIT OF A SYSTEM FOR INDUCTIVE POWER TRANSFER, A METHOD OF MANUFACTURING A PRIMARY POWER TRANSFER UNIT AND OF OPERATING A PRIMARY POWER TRANSFER UNIT" and insert -- POWER TRANSFER UNIT OF A SYSTEM FOR INDUCTIVE POWER TRANSFER, A METHOD OF MANUFACTURING A POWER TRANSFER UNIT AND OF OPERATING A POWER TRANSFER UNIT --

In the Claims

Column 14, Line 27, Claim 9, delete "and or" and insert -- and/or --

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*